US006232364B1

(12) United States Patent
Fukuda et al.

(10) Patent No.: US 6,232,364 B1
(45) Date of Patent: May 15, 2001

(54) ULTRAVIOLET CURABLE COATING COMPOSITIONS FOR CATIONIC ELECTRODEPOSITION APPLICABLE TO METALLIC MATERIALS AND ELECTRICALLY CONDUCTIVE PLASTIC MATERIALS

(75) Inventors: Masao Fukuda; Yoshiji Shimizu, both of Osaka (JP)

(73) Assignee: Shimizu Co., Ltd., Osaka (JP)

( * ) Notice: Subject to any disclaimer, the term of this patent is extended or adjusted under 35 U.S.C. 154(b) by 0 days.

(21) Appl. No.: 09/251,994

(22) Filed: Feb. 18, 1999

(51) Int. Cl.[7] .................................. C08F 2/50; C08F 2/46
(52) U.S. Cl. .............................. 522/121; 522/84; 522/85; 522/7; 522/142; 522/121; 522/182; 522/96; 522/90; 430/275; 430/276; 430/281.1; 430/284.1; 430/288.1; 430/270.1; 427/512; 427/514; 427/508; 427/509; 427/517
(58) Field of Search ........................ 522/84, 85, 142, 522/121, 182, 96, 90; 430/275, 276, 281.1, 284.1, 288.1, 270.1; 427/512, 514, 509, 517

(56) References Cited

U.S. PATENT DOCUMENTS

| | | | |
|---|---|---|---|
| 3,954,587 | * 5/1976 | Kowawa et al. | 204/181 |
| 4,029,561 | 6/1977 | McGinniss | 204/181 |
| 4,035,274 | 7/1977 | McGinniss | 204/181 |
| 4,039,414 | * 8/1977 | McGinnis | 204/181 |
| 4,070,258 | * 1/1978 | McGinniss | 204/159.15 |
| 4,252,734 | * 2/1981 | Barry et al. | 260/404.5 |
| 4,504,374 | * 3/1985 | Lewarchik et al. | 204/181 |
| 4,511,645 | * 4/1985 | Koike et al. | 430/276 |
| 4,632,897 | * 12/1986 | Barzynski et al. | 430/260 |
| 4,845,012 | * 7/1989 | Seko et al. | 430/287 |
| 4,877,818 | * 10/1989 | Emmons et al. | 522/26 |
| 4,987,054 | * 1/1991 | Sondergeld et al. | 430/275 |
| 5,045,434 | * 9/1991 | Yoshihara et al. | 430/286 |
| 5,057,400 | * 10/1991 | Yamaguchi et al. | 430/314 |
| 5,102,775 | * 4/1992 | Okuhara et al. | 430/287 |
| 5,230,984 | * 7/1993 | Tachiki et al. | 430/270 |
| 5,246,816 | * 9/1993 | Yamasita et al. | 430/284 |
| 5,268,256 | * 12/1993 | Goetz et al. | 430/284 |
| 5,328,805 | * 7/1994 | Huynh-Tran et al. | 430/284 |
| 5,338,613 | * 8/1994 | Tomotsugu et al. | 428/428.8 |
| 5,403,698 | * 4/1995 | Tachiki et al. | 430/286 |
| 5,483,012 | * 1/1996 | Midogohchi et al. | 525/453 |
| 5,929,161 | * 7/1999 | Schafheutl et al. | 524/591 |

FOREIGN PATENT DOCUMENTS

| | | |
|---|---|---|
| 3-282468 | 12/1991 | (JP) . |
| 4-153276 | 5/1992 | (JP) . |
| 05/263026 | * 10/1993 | (JP) . |

OTHER PUBLICATIONS

H.U. Schenck et al., "Electrodeposition: anodic versus cathodic", J. Oil Col. Chem. Assoc., 63, Mar. 1980, pp. 482–491.

* cited by examiner

*Primary Examiner*—James J. Seidleck
*Assistant Examiner*—Sanza McClendon
(74) *Attorney, Agent, or Firm*—Wenderoth, Lind & Ponack, L.L.P.

(57) ABSTRACT

An ultraviolet curable coating composition for cationic electrodeposition applicable to metal plated materials which composition comprises 100 weight parts of acrylic resin containing 10 to 70% by weight poly-functional acrylate per se having 3 or more acryloyl groups and 90 to 30% by weight of a resin of molecular weight 2,000–30,000 having a cationic electrodeposition property, and 0.1–10 weight parts of 2 or more species of photopolymerization initiators which absorb ultraviolet radiation in a wavelength range of 300–400 nm, as effective ingredients. The coating composition can readily be deposited electrically on metal materials including plated products and plastic materials provided with electrical conductivity and cured by irradiation of ultraviolet radiation within a short period of time to give a dry coating film which is appreciable in adhesiveness to the plated materials and good in appearance. Particularly, since the ultraviolet irradiation can be carried out at ordinary temperature, the method can be applied to non-heat-resistant materials such as plastics provided with electrical conductivity.

17 Claims, No Drawings

ULTRAVIOLET CURABLE COATING COMPOSITIONS FOR CATIONIC ELECTRODEPOSITION APPLICABLE TO METALLIC MATERIALS AND ELECTRICALLY CONDUCTIVE PLASTIC MATERIALS

BACKGROUND OF THE INVENTION

1. Field of the Invention

The present invention relates to ultraviolet curable coating compositions for cationic electrodeposition which afford anticorrosive properties, such as, waterproofness, chemical resistance, anti-sweating and anti-fingerprint, as well as multi-color variation, to metallic materials including plated products and plastics which are made electrically conductive by plating.

2. Description of the Related Art

As well known in literatures (for example, J. Oil Col. Chem. Assoc., 63, 482(1980)), the electrodeposition is a coating method which comprises dipping an electrically conductive material to be coated into a suspension of a charged film-forming material dispersed in water, and subjecting the conductive material to electrocoagulation by the passage of electric current through the suspension, and carrying out a baking treatment of the conductive material coated with the electrocoaglation.

The electrodeposition method has such major distinctive features that loss of coating material is low; automatic control of coating process is easy to reduce labor costs; a variety of materials to be coated are simultaneously treated; uniform film formation is possible in the inside and edge of the materials to be coated; and coating materials have good adhesiveness to the materials to be coated. Moreover, the electrodeposition using aqueous coating materials has also been appreciated in view of environmental pollution and disaster prevention.

The electrodeposition is classified roughly into anionic electrodeposition and cationic electrodeposition. The cationic electrodeposition has widely been employed as a coating method for the body of cars and in divisions of industrial materials, for the following reasons: since the material to be coated is a cathode in the cationic electrodeposition, metals under the coating or chemical coating film are scarcely flowed out; the coating film resin per se exhibits high anticorrosive properties since it is basic to act as corrosion retarder.

It is a problem, however, that the coating film used in the aforementioned prior art is heat curing and has a thermosetting temperature of 100° C. or higher, and so it cannot be used for heat-sensltive materials such as plastics.

In order to solve this problem, there is a method for coating the materials with ultraviolet curable coating materials by irradiation of ultraviolet radiation, and these coating materials are constituted by ultraviolet curable oligomers, monomers, photopolymerization initiators, sensitizers, and so on. Such coating materials are called coating materials of high-solid or solventless type. In these coating materials, the monomer is used for diluting other components in place of an organic solvent. Accordingly, there arises a problem that splashing of the monomer at the time of coating might afford a bad influence on the human body. This type of coating material has another problem that the coating film produced from this type of coating material is very hard, but fragile and less adhesive to the base material. This is problematic particularly on a smooth plated base material.

SUMMARY OF THE INVENTION

The object of the invention is to provide coating compositions for electrodeposition which are applicable to conventional metallic materials, die casting products of a metal such as aluminum, zinc, magnesium and brass which are plated with a metal, and plastic materials which are plated with a metal for providing electric conductivity, and which are good in adhesiveness and elasticity and afford high anticorrosion, transparency, luster and multi-color variation to the products.

The plating includes wet plating, such as, electroplating, electroless plating and chemical plating, as well as dry plating such as, vapor deposition, spattering and ion plating (PVD, CVD).

The present invention relates to an ultraviolet curable coating composition for cationic electrodeposition applicable to plated materials which comprises 100 weight parts of acrylic resin containing 10 to 70% by weight of polyfunctional acrylate per se having 3 or more acryloyl groups and 90 to 30% by weight of a resin of molecular weight 2,000 to 30,000 having a cationic electrodeposition property, and 0.1 to 10 weight parts, preferably, 1 to 6 weight parts of 2 or more species of photopolymerization initiators which absorb ultraviolet radiation in a wavelength range of 300 to 400 nm, as effective ingredients.

The coating composition for cationic electrodeposition is electrically deposited as an aqueous solution to a cathode plated material. The coating composition for cationic electrodeposition of the invention which contains photopolymerization initiators which are activated by light in an ultraviolet region, absorbs ultraviolet radiation as photo-energy under irradiation of ultraviolet radiation to produce acryloyl radicals, which polymerize mutually and are cured to form a coating film on a plated material.

According to the invention, 2 or more species of photopolymerization initiators which absorb ultraviolet radiation in the wavelength range of 300 to 400 nm may be used in an amount of 0.1 to 10 weight parts, preferably 1 to 6 weight parts, for 100 weight parts of the acrylic resin. As for a light source in ultraviolet irradiation, a high pressure mercury lamp is usually used. This lamp has a wide emission spectrum range of 300 to 400 nm in which the major wavelength is at 360 nm. On the other hand, materials of which the absorption wavelength exists within the range of ultraviolet wavelength has a narrow absorption wavelength range. Since the ultraviolet curable coating composition for cationic electrodeposition contains many components which do not contribute to curing, 2 or more species of photopolymerization initiators of which the absorption range is different from each other are used in combination in order to utilize efficiently the photo-energy from a light source and increase the curing rate considerably. When the rate of the photopolymerization initiators to be added is lower than the aforementioned rate, the acryloyl groups cannot transform rapidly into radicals to need much more time for curing. On the other hand, when the rate exceeds the aforementioned, it is inconvenient because the dispersibility of the coating composition decreases and the composition deposits in an aqueous solution. In order to prevent this phenomenon, it is necessary to use 2 or more species of photopolymerization initiators to utilize effectively the light source energy.

Table 1 shows the substances which have an ultraviolet absorption range of 300 to 400 nm and can be used as photopolymerization initiators, together with their absorption wavelengths. As shown in Table 2, the substances of Table 1 may preferably be used in combination of 2 or more species.

TABLE 1

| Substance | Absorption Wavelength |
|---|---|
| ① Benzyl dimethyl ketal | 340 nm |
| ② 2,4,6-Trimethylbenzophenone | 350 nm |
| ③ Oligo(2-hydroxy-2-methyl-1-(4-(1-methyl-vinyl)phenyl)propanone | 320 nm |
| ④ 2,2-Dimethoxy-1,2-diphenylethan-1-one | 360 nm |
| ⑤ 1-Hydroxy-cyclohexyl phenyl ketone | 330 nm |
| ⑥ 2-Hydroxy-2-methyl-1-phenylpropan-1-one | 325 nm |
| ⑦ Bis(2,4,6-trimethylbenzoyl)phenylphosphine oxide | 380 nm |
| ⑧ 2,4-Diethylthioxanthoine | 385 nm |
| ⑨ 3,3-Dimethyl-4-methoxy-benzophenone | 300 nm |
| ⑩ Ethyl p-dimethylaminobenzoate | 305 nm |
| ⑪ Isoamyl p-dimethylaminobenzoate | 312 nm |
| ⑫ Bis($\eta^5$-2,4-cyclopentadien-1-yl)-bis(2,6-difluoro-3-(1H-pyrrol-1-yl)-phenyl)titanium | 400 nm |

TABLE 2

| No | Example of Combination | Wavelength at Absorption |
|---|---|---|
| 1 | ⑥ 3 parts + ⑦ 1 part | 360–410 nm |
| 2 | ⑥ 19 parts + ⑦ 1 part | 320–360 nm |
| 3 | ⑤ 1 part + ⑥ 4 parts | 320–360 nm |
| 4 | ⑤ 1 part + ⑦ 1 part | 380–410 nm |
| 5 | ② 1 part + ⑨ 1 part | 320–350 nm |
| 6 | ② 3 parts + ③ 1 part + ⑨ 2 parts | 340–400 nm |

Since the ultraviolet curable coating composition for cationic electrodeposition of the invention contains 3 or more acryloyl groups in the acrylate molecule, radical polymerization of the acryloyl groups affords steric network structure to form a practically strong coating film. The ratio of the acrylate having 3 or more acryloyl groups in one molecule in the resin is 10 to 70% by weight. When the ratio is lower than 10% by weight, the radical is in short supply for the radical polymerization to induce insufficient curing. On the other hand, when the rate is over 70% by weight, the content of the resin with the cationic electrodeposition property decreases to 30% by weight or lower; thus, the cation is in short supply to yield insufficient electrodeposition.

The aforementioned multi-functional acrylate having 3 or more acryloyl groups includes trimethylolpropane triacrylate, pentaerythritol triacrylate, dipentaerythritol pentaacrylate, and the like. Preferably, those which are miscible well with resins having the cationic electrodeposition property and which are modified to have 3- or more multiple functions giving a good coating capacity, for example, polyester acrylate, urethane acrylate and epoxyacrylate, may be used.

The invention is characterized in that the resin having a cationic electrodeposition property is a copolymer of 1 to 20 weight parts of the following material (a) and 80 to 99 weight parts of one or a mixture of two or more of the following materials (b-1), (b-2) and (b-3), which copolymer has an average molecular weight of 3,000 to 30,000 and posses a tertiary amino group on a side chain.

(a) A vinyl monomer containing a tertiary amino group exemplified by dimethylaminomethyl (meth)acrylate, dimethylaminoethyl (meth)acrylate, dimethylaminopropyl (meth)acrylate, vinylpyridine, and the like.

(b-1) An α,β-Ethylenic unsaturated monocarboxylic acid hydroxy ester exemplified by hydroxyethyl (meth)acrylate, hydroxypropyl (meth)acrylate, hydroxybutyl (meth)acrylate, and the like.

(b-2) An α,β-Ethylenic unsaturated monocarboxylic acid alkyl ester exemplified by methyl (meth)acrylate, ethyl (meth)acrylate, propyl (meth)acrylate, butyl (meth)acrylate, 2-ethylhexyl (meth)acrylate, lauryl (meth)acrylate, boronyl (meth)acrylate, benzyl (meth)acrylate, cyclohexyl (meth)acrylate, phenoxyethyl (meth)acrylate, and the like.

(b-3) An α,β-Ethylenic unsaturated compound exemplified by styrene, methylstyrene, vinylcarbazole, and the like.

The vinyl monomer (a) containing a tertiary amino group, which is an essential component for giving a cationic electrodeposition property and affords adherent property of the coating film to the basal plated coat, may be used in a polymerization rate of 1 to 20 weight parts, preferably, 3 to 10 weight parts. When the polymerization rate is extremely low, no uniform film is formed because the polymer resin is not dispersed to decrease the electrodeposition property to induce abnormal deposition. When the rate is excessive, the electric conductivity of the coating material increases to induce abnormal deposition, too.

The α,β-ethylenic unsaturated monocarboxylic acid hydroxy ester (b-1) which is copolymerized with the tertiary amino-containing vinyl monomer is used as a component assisting moisture dispersion and for the purpose of affording an adherent property to the basal plated coat. The compounding amount that may be set in a wide range is preferably 5 to 20 weight parts. Excessive use is not preferable because the moisture-absorption rate increases in the coating film.

The α,β-ethylenic unsaturated monocarboxylic acid alkyl ester (b-2) is used for the purpose of affording flexibility and a flowing property to the coating film. The compounding amount may be set in a wide range as needed.

The α,β-ethylenic unsaturated compound (b-3) is if required used as a coagent for improving such a property as water resistance or chemical resistance of the coating film or as a regulator for Tg of the coating film. Excessive use increases brittleness, and accordingly the amount to be used is limited up to 30 weight parts.

The copolymerization may be achieved by the known radical polymerization method. That is, the copolymer may be produced by solution polymerization using an appropriate solvent, for example, methanol, ethanol, isopropyl alcohol, methylcellosolve, ethylcellosolve, butylcellosolve, butylcellosolve acetate, toluene, xylene, and the like.

The resulting copolymer, a basic substance, is neutralized, to which water dispersibility required for the electrodeposition is given. The acid required for the neutralization includes organic acids, such as, acetic acid, formic acid, propionic acid, lactic acid, and the like, and inorganic acids, such as, sulfuric acid, phosphoric acid, and the like.

When the copolymer of the aforementioned (a) with one or a mixture of two or more of (b-1), (b-2) and (b-3) is used as a resin having the cationic electrodeposition property, the tertiary amino and hydroxy groups attached to the side chain produce an adherent property for the basal plated coat. Moreover, by selecting an appropriate one from (b-2) and (b-3) as a copolymer component, elasticity and hardness of the coating film can be controlled as needed.

Moreover, the invention is characterized in that the resin having the cationic electrodeposition property is a polyurethane having an average molecular weight of 2,000 to 10,000 containing a tertiary amino group represented by a formula:

(wherein R is an alkyl of 4 or less carbon atoms).

In general, polyurethanes can be synthesized by reacting a divalent alcohol (diol) with a divalent isocyanate (diisocyanate). In this invention, however, since a tertiary amino group has to be introduced in order to introduce a cationic property, it is necessary to introduce a tertiary aminodiol to a part of the divalent alcohols.

The tertiary aminodiol includes, for example, N-methyl diethanolamine, N-ethyldiethanolamine, N-propyldiethanolamine, N-butyldiethanolamine, and the like. Other diol includes, for example, ethylene glycol, 1,3-propanediol, 1,4-butanediol, 1,5-pentanediol, 1,6-hexanediol, p-xylene glycol, polycarbonate diol, caprolactone diol, and the like. The compounding ratio of the tertiary aminodiol to the other diol as mentioned above is preferably 1:3 by molar ratio. When the tertiary aminodiol component is smaller than this ratio, the electrodeposition is impossible. Excessiveness induces an abnormal appearance of the coating film.

The other component for polyurethane synthesis, diisocyanate, includes, for example, 4,4-diphenylmethane diisocyanate, tolylene diisocyanate, xylylene diisocyanate, metaxylylene diisocyante, hexamethylene diisocyanate, isophorone diisocyanate, 4,4-methylenebis(cyclohexyl isocyanate), trimethylhexamethylene diisocyanate, 1,3-(isocyanate methyl)cyclohexane, and the like.

The aforementioned diols and diisocyanates may be applied to addition polymerization in a solvent having no active hydrogen, for example, benzene, toluene, xylene, acetone, methyl ethyl ketone, methyl acetate, ethyl acetate, and the like, in a conventional way.

The resulting polymer, a basic substance, is neutralized, to which water dispersibility required for the electrodeposition is given. The acid required for the neutralization includes organic acids, such as, acetic acid, formic acid, propionic acid, lactic acid, and the like, and inorganic acids, such as, sulfuric acid, phosphoric acid, and the like.

When the aforementioned polyurethane containing a tertiary amino group is used as a resin having the cationic electrodeposition property, the coating film which has good adhesiveness, water resistance, particularly, good elasticity can be obtained.

The aforementioned respective components are transformed into electrodeposition materials according to the following method (1) or (2).

(1) A multi-functional acrylate is mixed with a neutralized tertiary amino-containing vinyl monomer and a copolymer of one or more species of α,β-ethylenic unsaturated monocarboxylic acid hydroxy ester or α,β-ethylenic unsaturated monocarboxylic acid alkyl ester or α,β-ethylenic unsaturated compound, then photopolymerization initiators are added, and the mixture is diluted with ion-exchanged water to adjust the resin content in 8 to 15%.

(2) A multi-functional acrylate is mixed with the neutralized tertiary amino-containing polyurethane as mentioned above, then photopolymerization initiators are added, and the mixture is diluted with ion-exchanged water to adjust the resin content in 8 to 15%.

Moreover, the invention is characterized in that the coating composition for electrodeposition comprises 20 weight parts or less of a coating material or pigment or a mixture thereof as needed.

According to the invention, if required, a dyestuff or pigment may be added to the above-prepared ultraviolet curable coating composition for cationic electrodeposition in order to afford color variation. The usable preferred dyestuff is of mordant dye. The pigment includes organic pigment, for example, those of azo-type, phthalocyanine type, metallic complex salt, quinacridone type, and the like, and inorganic pigment, for example, metal oxides such as titanium oxide and ferric oxide, and barium sulfate. The well-known carbon black may also be used.

The mixing rate of the dyestuff or pigment may be determined according to light and shade of the intended color, but it should not be over 20% by weight for the total amount of the ultraviolet curable coating composition for cationic electrodeposition. When this limitation is exceeded, the aforementioned characteristics of the invention are lost.

According to the invention as mentioned above, irradiation of ultraviolet radiation at ordinary temperature hardens the resin electrically deposited on the surface of the material to be coated, and accordingly the resin can be applied to plated materials can be applied to plated products of non-heat resistant plastics. This is also applicable to products of diecasting materials plated with a metal such as aluminum, zinc, magnesium and brass, without fear of producing any swelling caused by baking treatment at high temperature. Moreover, the curing time can be reduced by combination of 2 or more of photopolymerization initiators. Accordingly, the curing time is far shorter than in the prior art electrodeposition by the baking treatment at high temperature.

DETAILED DESCRIPTION OF THE PREFERRED EMBODIMENT

The invention will be explained in more detail by the following examples which are not intended as a limitation thereof.

EXAMPLE 1

(1-A) In a four-necked flask equipped with a stirrer, condenser, thermometer and dropping funnel at each neck were placed 200 g of the trimer (isocyanurate) of hexamethylene diisocyanate and 135 g of xylene. A mixture of 116 g of 2-hydroxyethyl acrylate, 0.46 g of dibutyltin dilaurate as a catalyst and 0.1 g of methoquinone as a polymerizing inhibitor was dropwise added through the dropping funnel with stirring over 10 minutes at a fixed rate. The mixture was further stirred for 90 minutes with keeping the temperature at 40° C. or lower to give an intended acrylate solution. The completion of the reaction of the isocyante group was confirmed by disappearance of the peak at 2270 cm$^{-1}$ by infrared absorption spectra.

(1-B) To 300 g of isopropyl alcohol as a solvent were added 40 g of dimethylaminoethyl methacrylate (a), 100 g of 2-hydroxyethyl methacrylate (b-1), 90 g of 2-ethylhexyl acrylate, 50 g of n-butyl methacrylate and 145 g of methyl methacrylate (b-2), and 75 g of styrene. Then, the combination No. 3 of photopolymeriation initiators as shown in Table 2, namely, 1 g of 1-hydroxy-cyclohexyl phenyl ketone and 4 g of 2-hydroxy-2-methyl-1-phenylpropan-1-one were added. The resulting mixture was placed in a 4-necked flask equipped with a stirrer and so on in the same way as in (1-A) and warmed up with stirring. After starting of flux, an equal amount of the mixture of the same component was dropwise added through the dropping funnel homogeneously over 90 minutes, and the mixture was stirred at 85° C. for 4 hours to give a solution of the copolymer resin having the cationic electrodeposition property. The average molecular weight of this copolymer was 26,000, which was confirmed by GPC.

(1-C) The copolymer solution (91 g) prepared in (1-B) was neutralized with 1.9 g of lactic acid. There was added the acrylate solution (71.4 g) prepared in (1-A) and 1 g of 2-hydroxy-2-methylpropiophenone as a photopolymerization initiator with stirring. Then, the mixture was made to 1 liter in total by addition of ion-exchange water with stirring to give the ultraviolet curable coating composition for cationic electrodeposition of the invention.

EXAMPLE 2

(2-c) The copolymer solution (127 g) prepared in (1-B) was neutralized with 2.7 g of lactic acid. There was added 30 g of a commercially available acrylate having 3 or more functional groups, i.e., Urethane Acrylate UA-101T (trade name; Kyoei Chemical Co., Ltd.), and the photopolymerization initiators of combination No. 1 as shown in Table 2, namely, 3 g of 2-hydroxy-2-methyl-1-phenylpropan-1-one and 1 g of bis(2,4,6-trimethylbenzoyl)phenylphosphine oxide with stirring. Then, the mixture was made to 1 liter in total by addition of ion-exchange water with stirring to give the ultraviolet curable coating composition for cationic electrodeposition of the invention.

EXAMPLE 3

(3-B) A solution of 106.7 g of isophorone diisocyanate contained in (c-3) dissolved in 75.8 g of xylene was placed in a 4-necked flask equipped with a stirrer and so on at each neck in the same way as in (1-A). There was dropwise added a solution of 220.7 g of PLACCEL205 (trade name; Daicel Chemical Industries, Ltd.) contained in a commercially available (c-1) and 24.4 g of N-methyldiethanolamine dissolved in 75 g of xylene with stirring through a dropping funnel within 30 minutes. The mixture was stirred at 40° C. or lower for 120 minutes to give a solution of the polyurethane having a tertiary amino group. The completion of the reaction of the isocyante group was confirmed by disappearance of the peak at 2270 cm$^{-1}$ by infrared absorption spectra.

(3-C) The solution (71.4 g) of the polyurethane having a tertiary amino group prepared in (3-B) was neutralized with 2.2 g of lactic acid. There was added 150 g of a commercially available acrylate, OPF-Resin T, and photopolymerization initiators of combination No. 6 as shown in Table 2, namely, 3 g of 2,4,6-trimethylbenzophenone, 1 g of oligo (2-hydroxy-2-methyl-1-(4-(1-methyl-vinyl)phenyl) propanone and 2 g of 3,3-dimethyl-4-methoxybenzophenone with stirring. Then, the mixture was made to 1 liter in total by addition of ion-exchange water with stirring to give the ultraviolet curable coating composition for cationic electrodeposition of the invention.

COMPARATIVE EXAMPLE 1

To the urethane acrylate solution prepared in Example 1, (1-A), was added 1 g of 2-hydroxy-2-methylpropiophenone as a photopolymerization initiator with stirring and then added xylene to make 1 liter in total to give an ultraviolet curable coating composition for electrodeposition.

COMPARATIVE EXAMPLE 2

The cationic acrylic copolymer solution (91 g) prepared in Example 1, (1-B), was neutralized with 1.9 g lactic acid, to which was added photopolymerization initiators of combination No. 1 as shown in Table 2, namely, 3 g of 2-hydroxy-2-methyl-1-phenylpropan-1-one and 1 g of bis(2,4,6,-trimethylbenzoyl)phenylphosphine oxide with stirring. The mixture was made to 1 liter in total to give an ultraviolet curable coating composition for electrodeposition.

Test for Evaluation

Test pieces (5 mm×5 mm) which were prepared by nickel plating on an ABS resin were electrically deposited according to the conventionally utilized method in a film thickness of 10 μm with ultraviolet curable coating compositions for cationic electrodeposition which were prepared in the aforementioned Examples 1–3 and Comparative Examples 1 and 2. The pieces were dried at 80° C. for 10 minutes and then irradiated with ultraviolet radiation by use of an UV drier (80 W high pressure mercury lamp; Eye Graphic Co.) at a distance of 20 cm for 2 minutes. The results of evaluation of the coating films are shown in Table 3.

TABLE 3

| Test Item | Example 1 | Example 2 | Example 3 | Comp. Ex. 1 | Comp. Ex. 2 |
|---|---|---|---|---|---|
| Appearance | ○ | ○ | ○ | Δ | ○ |
| Uniformity | ○ | ○ | ○ | X | Δ |
| Adhesiveness | 100/100 | 100/100 | 100/100 | 0/100 | 70/100 |
| Hardness | 2H | 3H | 2H | 4H | 2B |
| 180° Bending test | ○ | ○ | ○ | ○ | ○ |
| CASS 72 hrs | ○ | ○ | ○ | ○ | X |
| Acetone Rubs | 100 times or more | 100 times or more | 100 times or more | 100 times or more | 10 times or less |
| Resistance to Boiling Water 5 hrs | ○ | ○ | ○ | ○ | X |
| 5% NaOH 48 hrs | ○ | ○ | ○ | ○ | X |
| 5% H$_2$SO$_4$ 48 hrs | ○ | ○ | ○ | ○ | X |

The test was carried out as follows.

Appearance (visual observation): Δ:slight roughness

Unifomity (visual observation): Δ:somewhat poor; x: poor

Adhesiveness: Eleven cuts were made crosswise, respectively, on the test piece at intervals of 1 mm, a cellophane tape was stuck thereon and peeled off. The number of the remaining sections not peeled is given (JIS K 5651).

Hardness: Mitsubishi pencil Uni, load of 1 kg

180° bending test: The test pieces were bent into a 180° angle, and a cellophane tape was stuck on the fold surface and peeled off. ○: no peeling-off CASS 72 hrs (JIS K 8617): ○: normal; x: poor Acetone Rubs: An acetone-soaked cloth was loaded with 1 kg and moved reciprocally on the test piece. The value indicates the number of reciprocation until the undercoating appears.

5 hrs resistance to boiling water: The pieces were dipped in hot water at 90° C. or higher for 5 hours, and the external appearances were visually observed. ○: normal; x: poor 5% NaOH 48 hrs: The pieces were dipped in 5% NaOH at 25 C. for 48 hours, and the external appearances were visually observed. ○: normal; x: poor 5% $H_2SO_4$ 48 hrs: The pieces were dipped in 5% sulfuric acid aqueous solution at 25° C. for 48 hours, and the external appearances were visually observed. ○: normal; x: poor The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. An ultraviolet curable coating composition for cationic electrodeposition applicable to plated materials, comprising 100 weight parts of acrylic resin containing 10 to 70% by weight poly-functional acrylate per se having 3 or more acryloyl groups and 90 to 30% by weight of a resin of molecular weight 2,000 to 30,000 having a cationic electrodeposition property, and 0.1 to 10 weight parts of a photopolymerization initiator which comprises at least two compounds selected from the group consisting of:

Benzyl dimethyl ketal;
   2,4,6-Trimethyl benzophenone;
   Oligo (2-hydrox-2-methyl-1-(4-(1-methyl-vinyl)phenyl) propanone;
   2,2-Dimethoxy-1,2-diphenylethan-1-one;
   1-Hydroxy-cyclohexyl phenyl ketone;
   2-Hydroxy-2-methyl-1-phenylpropan-1-one;
   Bis (2,4,6-trimethylbenzoyl)phenyphosphine oxide;
   2,4-Diethylthioxanthoine;
   3,3-Dimethyl-4-methoxy-benzophenone;
   Ethyl p-dimethylaminobenzoate;
   Isoamyl p-dimethylaminobenzoate; and
   Bis ($n^5$-2,4-cyclopentadien-l-yl)-bis(2,6-difluoro-3-(1H-pyrrol-1-yl)-phenyl) titanium.

2. The ultraviolet curable coating composition for cationic electrodeposition of claim 1, wherein a ratio of the acrylic resin is 100 weight parts and a ratio of the photopolymerization initiators as effective ingredients is 1 to 6 weight parts.

3. The ultraviolet curable coating composition for cationic electrodeposition of claim 1, wherein the resin having a cationic electrodeposition property is a copolymer of 1 to 20 weight parts of the following material (a) and 80 to 99 weight parts of one or a mixture of two or more of the following materials (b-1), (b-2) and (b-3), which copolymer has an average molecular weight of 3,000 to 30,000 and posses a tertiary amino group on a side chain:

(a) a vinyl monomer containing a tertiary amino group,
   (b-1) an α,β-ethylenic unsaturated monocarboxylic acid hydroxy ester,
   (b-2) an α,β-ethylenic unsaturated monocarboxylic acid alkyl ester, and
   (b-3) an α,β-ethylenic unsaturated compound.

4. The ultraviolet curable coating composition for cationic electrodeposition of claim 1, wherein the resin having the cationic electrodeposition property is a polyurethane having an average molecular weight of 2,000 to 10,000 containing a tertiary amino group represented by a formula:

wherein R is an alkyl of 4 or less carbon atoms.

5. The ultraviolet curable coating composition for cationic electrodeposition of claim 1, comprising 20 weight parts or less of a coating material or pigment or a mixture thereof as needed.

6. The ultraviolet curable coating composition for cationic electrodeposition of claim 2, comprising 20 weight parts or less of a coating material or pigment or a mixture thereof as needed.

7. The ultraviolet curable coating composition for cationic electrodeposition of claim 3, comprising 20 weight parts or less of a coating material or pigment or a mixture thereof as needed.

8. The ultraviolet curable coating composition for cationic electrodeposition of claim 4, comprising 20 weight parts or less of a coating material or pigment or a mixture thereof as needed.

9. The ultraviolet curable coating composition for cationic electrodeposition of claim 1, wherein the photopolymerization initiators are 2-hydroxy-2-methyl-1-phenylpropan-1-one and bis(2,4,6-trimethylbenzoyl)phenylphosphine oxide, which are used in a combination of 3 weight parts of 2-hydroxy-2-methyl-1-phenylpropan-1-one and 1 weight part of bis(2,4,6-trimethylbenzoyl)phenylphosphine oxide.

10. The ultraviolet curable coating composition for cationic electrodeposition of claim 1, wherein the photopolymerization initiators are 1-hydroxy-cyclohexyl phenyl ketone and 2-hydroxy-2-methyl-1-phenylpropan-1-one, which are used in a combination of 1 weight part of 1-hydroxy-cyclohexyl phenyl ketone and 4 weight parts of 2-hydroxy-2-methyl-1-phenylpropan-1-one.

11. The ultraviolet curable coating composition for cationic electrodeposition of claim 1, wherein the photopolymerization initiators are 2,4,6-trimethylbenzophenone, oligo (2-hydroxy-2-methyl-1-(4-(1-methyl-vinyl)phenyl) propanone and 3,3-dimethyl-4-methoxy-benzophenone, which are used in a combination of 3 weight parts of 2,4,6-trimethylbenzophenone, 1 weight part of oligo (2-hydroxy-2-methyl-1-(4-(1-methyl-vinyl)phenyl) propanone and 2 weight parts of 3,3-dimethyl-4-methoxy-benzophenone.

12. The ultraviolet curable coating composition for cationic electrodeposition of claim 2, wherein the photopolymerization initiators are 2-hydroxy-2-methyl-1-phenylpropan-1-one and bis(2,4,6-trimethylbenzoyl) phenylphosphine oxide, which are used in a combination of 3 weight parts of 2-hydroxy-2-methyl-1-phenylpropan-1-one and 1 weight part of bis(2,4,6-trimethylbenzoyl) phenylphosphine oxide.

13. The ultraviolet curable coating composition for cationic electrodeposition of claim 2, wherein the photopolymerization initiators are 1-hydroxy-cyclohexyl phenyl ketone and 2-hydroxy-2-methyl-1-phenylpropan-1-one, which are used in a combination of 1 weight part of 1-hydroxy-cyclohexyl phenyl ketone and 4 weight parts of 2-hydroxy-2-methyl-1-phenylpropan-1-one.

14. The ultraviolet curable coating composition for cationic electrodeposition of claim 2, wherein the photopolymerization initiators are 2,4,6-trimethylbenzophenone, oligo(2hydroxy-2-methyl-1-(4-(1-methyl-vinyl)phenyl) propanone and 3,3-dimethyl-4-methoxy-benzophenone, which are used in a combination of 3 weight parts of 2,4,6-trimethylbenzophenone, 1 weight part of oligo (2-hydroxy-2-methyl-1-(4-(1-methyl-vinyl)phenyl) propanone and 2 weight parts of 3,3-dimethyl-4-methoxy-benzophenone.

15. The ultraviolet curable coating composition for cationic electrodeposition of claim 3, wherein the photopolymerization initiators are 2-hydroxy-2-methyl-1-phenylpropan-1-one and bis(2,4,6-trimethylbenzoyl) phenylphosphine oxide, which are used in a combination of 3 weight parts of 2-hydroxy-2-methyl-1-phenylpropan-1-one and 1 weight part of bis(2,4,6-trimethylbenzoyl) phenylphosphine oxide.

16. The ultraviolet curable coating composition for cationic electrodeposition of claim 3, wherein the photopolymerization initiators are 1-hydroxy-cylohexyl phenyl ketone and 2-hydroxy-2-methyl-1-phenylpropan-1-one, which are used in a combination of 1 weight part of 1-hydroxy-cylohexyl phenyl ketone and 4 weight parts of 2-hydroxy-2-methyl-1-phenylpropan-1-one.

17. The ultraviolet curable coating composition for cationic electrodeposition of claim 3, wherein the photopolymerization initiators are 2,4,6-trimethylbenzophenone, oligo (2-hydroxy-2-methyl-1-(4-(1-methyl-vinyl)phenyl) propanone and 3,3-dimethyl-4-methoxy-benzophenone, which are used in a combination of 3 weight parts of 2,4,6-trimethylbenzophenone, 1 weight part of oligo (2-hydroxy-2-methyl-1-(4-(1-methyl-vinyl)phenyl) propanone and 2 weight parts of 3,3-dimethyl-4-methoxy-benzophenone.

* * * * *